United States Patent [19]

Kanai et al.

[11] Patent Number: 5,166,288
[45] Date of Patent: Nov. 24, 1992

[54] COATING COMPOSITION FOR COATING METAL PLATE

[75] Inventors: Hiroshi Kanai; Joji Oka, both of Kimitsu; Takao Hirayama, Kashima; Tsuneo Tanuma, Hitachi, all of Japan

[73] Assignee: Nippon Steel Corporation, Tokyo, Japan

[21] Appl. No.: 456,750

[22] Filed: Dec. 26, 1989

[30] Foreign Application Priority Data

Dec. 26, 1988 [JP] Japan .................................. 63-325916
Feb. 23, 1989 [JP] Japan .................................... 1-41650

[51] Int. Cl.$^5$ ........................ C08C 61/00; C08C 61/20
[52] U.S. Cl. ..................................... 525/443; 525/509; 525/517.5; 525/441; 525/437
[58] Field of Search ..................... 525/443, 549, 517.5, 525/441, 437

[56] References Cited

U.S. PATENT DOCUMENTS

| | | | |
|---|---|---|---|
| 3,908,050 | 9/1975 | Gor | 525/443 |
| 4,397,989 | 8/1983 | Adesko | 525/482 |
| 4,716,200 | 12/1987 | Berghoff | 525/163 |
| 4,751,267 | 6/1988 | Berghoff | 525/502 |
| 4,835,227 | 5/1989 | Mormile | 525/509 |
| 4,839,427 | 6/1989 | Mormile | 525/443 |

*Primary Examiner*—James J. Seidleck
*Assistant Examiner*—W. R. H. Clark
*Attorney, Agent, or Firm*—Wenderoth, Lind & Ponack

[57] ABSTRACT

A coating composition for coating a metal plate, and containing (i) 100 parts by weight of a polyester-melamine resin composed of (a) a polyester resin having a glass transition temperature of 5° to 40° C. and a number average molecular weight of 15,000 to 30,000 and (b) a melamine resin at a weight ratio (a)/(b) of 75/25 to 55/45 and (ii) 1 to 2 parts by weight of an amine-blocked derivative of a long-chain alkylbenzenesulfonic acid.

5 Claims, No Drawings

COATING COMPOSITION FOR COATING METAL PLATE

BACKGROUND OF THE INVENTION

1. Field of the Invention

The present invention relates to a coating composition for coating a metal plate, and having an excellent hardness, processability (or workability), and stain resistance.

2. Description of the Related Art

In the prior art, the coating of, for example, appliances, is practiced in box-type shapes after the steel plate has been worked and molded, but to solve various problems such as a required rationalization of the coating line and an improvement of the productivity, the precoat coating system, in which the working and molding is conducted after the coating of flat steel plate, is now widely used. The coated steel plate used in this system must have an excellent processability, so that it can be worked to form any complicated shape after coating. Also, for appliances such as refrigerators and washing machine, the various properties such as coating hardness, stain resistance, and chemical resistance, must be high.

A high molecular weight polyester resinmelamine resin coating has an excellent processability, and although practically applied for the coated steel plate as mentioned above, does not have a sufficient hardness and contamination resistance.

For example, Japanese Patent Publication (Kokoku) No. 61-32351 discloses a high molecular weight polyester resin and an alkyletherated aminoformaldehyde formulated at 95-70:5-30 (weight ratio), and further, p-toluenesulfonic acid or an amine salt thereof formulated at a ratio of 5% by weight based on the alkyletherated aminoformaldehyde, but the resultant coating does not have a sufficient stain resistance, particularly a stain resistance to red marking ink.

SUMMARY OF THE INVENTION

Accordingly, the objects of the present invention are to eliminate the above-mentioned disadvantages of the prior art and to provide a coating composition for coating a metal plate, having, for example, an excellent processability, hardness, and stain resistance.

Other objects and advantages of the present invention will be apparent from the following description.

In accordance with the present invention, there is provided a coating composition having an excellent processability, hardness, and stain resistance, by formulating a specific acid catalyst in a specific formulation of a specific polyester resin-melamine resin. Namely, there is provided a coating composition for coating a metal plate, comprising (i) 100 parts by weight of a polyester-melamine resin comprising (a) a polyester resin having a glass transition temperature of 5° to 40° C and a number average molecular weight of 15,000 to 30,000 and (b) a melamine resin at a weight ratio (a)/(b) of 75/25 to 55/45 and (ii) 1 to 2 parts by weight of an amine-blocked derivative of a long-chain alkylbenzene-sulfonic.

The polyester resin usable in the present invention has a glass transition temperature of 5° to 40° C. and a number average molecular weight of 15,000 to 30,000 and is synthesized from a polybasic acid and a polyhydric alcohol.

The usable polybasic acids include, for example, terephthalic acid, isophthalic acid, phthalic acid, adipic acid, succinic acid, azelaic acid, sebacic acid, maleic acid, fumaric acid, cyclohexane dicarboxylic acid, or lower alkyl esters, and acid anhydrides thereof. These acids may be used alone or in any mixture thereof.

The usable polyhydric alcohols include, for example, ethylene glycol, 1,2-propane diol, 1,3-propane diol, 1,3-butane diol, 1,4-butane diol, neopentyl glycol, 1,5-pentane diol, 3-methylpentane diol, 1,6-hexane diol, diethylene glycol, and 1,4-cyclohexane dimethanol. These alcohols may be used alone or in any mixture thereof.

Trivalent or more polybasic acids, such as trimellitic acid, pyromellitic acid, or trivalent or more polyhydric alcohols, such as pentaerythritol, trimethylolpropane, trimethylolethane, glycerine can be also used in the above polyester resin, in an amount of 5% by weight or less, preferably 2% by weight or less.

The polyester resin of the present invention can be prepared by, for example, esterifying the above-mentioned polybasic acid with the above-mentioned polyhydric alcohol, optionally in the presence of a catalyst (e.g., dibutyltin dioxide, antimony trioxide) at 150° to 300° C., and subsequently carrying out the reaction under a reduced pressure of 1 mmHg to obtain a polyester resin having a high molecular weight.

The glass transition temperature of the polyester resin usable in the present invention is preferably 5° C. to 40° C. When the glass transition temperature is lower than 5° C., the hardness, chemical resistance, and stain resistance will be lowered. Contrary to this, when the glass transition temperature is higher than 40° C., the processability will be poor. The "glass transition temperature" as mentioned herein is measured according to the TMA (Thermo Mechanical Analyzer) penetration method.

The number average molecular weight of the polyester resin is preferably 15,000 to 30,000. When the glass transition temperature is less than 15,000, the processability, hardness, and chemical resistance will be lowered. When the glass transition temperature is higher than 30,000, the viscosity of the coating material becomes too high, and thus the coatability thereof becomes poor. The "number average molecular weight" as mentioned herein is measured by gel permeation chromatography using the calibration curve of a standard polystyrene.

The melamine resin usable in the present invention contains, for example, 60% by weight or more, more preferably 70% to 100% by weight of hexamethoxymethylolmelamine monomer, and includes, for example, Cymel 301 and 303 (manufactured by Mitsui Cyanamide). A melamine resin containing less than 60% of hexamethoxymethylolmelamine monomer will have a poor processability, particularly a low stain resistance.

The formulation ratio of the polyester resin and the melamine resin is preferably 75/25 to 55/45, more preferably 70/30 to 60/40, in terms of weight ratio. When the content of the melamine resin is less than 25 parts by weight, the hardness and stain resistance will be lowered, and when the content is greater than 45 parts by weight, the processability and acid resistance will be lowered.

The acid catalyst usable in the present invention includes, for example, an amine-blocked derivative of a long-chain alkylbenzenesulfonic acid having $C_{10}$–$C_{20}$ alkyl group, typically dodecylbenzenesulfonic acid, and 1 to 2 parts by weight, preferably 1.3 to 1.8 parts by weight of the active ingredient is added to 100 parts by weight of the polyester-melamine resin. A good balance of the luster, hardness, processability, and stain resistance cannot be obtained with other acid catalyst systems. When the amount of the catalyst is less than 1 part by weight, the hardness, stain resistance, chemical resistance, and solvent resistance will be lowered, and when the amount is more than 2 parts by weight, the processability will be poor.

The polyester resin of the present invention and the coating material thereof may be diluted before use, if necessary, with a solvent such as aromatic hydrocarbons, aliphatic hydrocarbons, esters, ketones, and ethers. Further, if desired, pigments, plasticizers, colorants, leveling agents, and defoaming agents, etc. can be added.

The coating material thus obtained can be coated on the metal plate surface of iron, non-iron metal, and plated steel plate, by conventional methods such as roll coating and curtain coating, followed by baking.

EXAMPLES

The present invention will now be further illustrated by, but is by no means limited to, the following Examples.

Examples 1 to 5 and Comparative Examples 1 to 8

A mixture of 273.9 parts by weight (1.65 mole) of terephthalic acid, 74.7 parts by weight (0.45 mole) of isophthalic acid, 131.4 parts by weight (0.9 mole) of adipic acid, 124 parts by weight (2.0 mole) of ethylene glycol, 125 parts by weight (1.2 mole) of neopentyl glycol, and 0.1 part by weight of dibutyltin dioxide was subjected to esterification in the presence of an inert gas at 250° C. for 2 hours, followed by a reaction under a reduced pressure of 1 mmHg at 270° C., to obtain a polyester resin A having a number average molecular weight of 20,000 and a glass transition temperature of 18° C.

Copolymerized polyesters B, C., D, E, and F having the polyester resin compositions and characteristics as shown in Table 1 were synthesized in the same way as described above.

The molecular weight was measured by a Hitachi Model 665 HLC and TSK-G3000H, TSK-G4000H, and TSK-GMH (all available from Toso Kabushiki Kaisha) columns connected in series, using tetrahydrofuran as the eluent to obtain a chromatogram, followed by a calculation based on the standard polystyrene.

The glass transition temperature was measured by a TMS-1 (Perkin Elmer) using the penetration method.

The polystyrene resin obtained above was formulated with the thinner as shown in Table 2, and after titanium ioxide was dispersed in the mixture, the melamine resin, the acid catalyst, and the leveling agent were formulated therein. The coating material thus obtained was coated on an electrically zinc plated 0.6 mm steel plate (chromate treated) to a dry film thickness of 18 to 20 μ, and baked at 280° C. for one minute (peak metal temperature 230° C.). The results of tests of the obtained coated steel plate are shown in Tables 2 and 3.

TABLE 1

| Starting materials | | Copolymerized polyester resins | | | | | |
|---|---|---|---|---|---|---|---|
| (mole %) | | A | B | C | D | E | F |
| Acid components | Terephthalic acid | 55 | 33 | 40 | 55 | 57 | 47 |
| | Isophthalic acid | 15 | 31 | 40 | 15 | 30 | 8 |
| | Adipic acid | 30 | 36 | 20 | 25 | 13 | 45 |
| Alcohol components | Ethylene glycol | 62 | 55 | 45 | 62 | 55 | 45 |
| | Neopentyl glycol | 38 | 45 | 55 | 38 | 45 | 55 |
| Characteristics | Number average molecular weight | 20,000 | 21,000 | 19,000 | 12,000 | 20,000 | 20,000 |
| | Glass transition temperature °C. | 18 | 9 | 35 | 17 | 47 | 0 |

TABLE 2

| Materials and items | | | | Example | | | | |
|---|---|---|---|---|---|---|---|---|
| | | | Example No. | 1 | 2 | 3 | 4 | 5 |
| Coating formulation | Polyester resin | A | Parts by weight | 70 | — | — | 60 | — |
| | " | B | Parts by weight | — | 70 | — | — | 60 |
| | " | C | Parts by weight | — | — | 70 | — | — |
| | " | D | Parts by weight | — | — | — | — | — |
| | " | E | Parts by weight | — | — | — | — | — |
| | " | F | Parts by weight | — | — | — | — | — |
| | Thinner | (1) | Parts by weight | 200 | 200 | 200 | 200 | 200 |
| | Titanium dioxide | (2) | Parts by weight | 100 | 100 | 100 | 100 | 100 |
| | Melamine resin A | (3) | Parts by weight | 30 | 30 | 30 | 40 | 40 |
| | Melamine resin B | (4) | Parts by weight | | | | | |
| | Acid catalyst A | (5) | Parts by weight | 1.5 | 1.5 | 1.5 | 1.5 | 1.5 |
| | Acid catalyst B | (6) | Parts by weight | | | | | |
| | Leveling agent | (7) | Parts by weight | 0.5 | 0.5 | 0.5 | 0.5 | 0.5 |

TABLE 2-continued

| Materials and items | | Example No. | Example 1 | 2 | 3 | 4 | 5 |
|---|---|---|---|---|---|---|---|
| Coating tests | Luster | (8) | 90 | 91 | 89 | 90 | 90 |
| | Hardness | (9) | H-2 H | H | 2 H | 2 H | 2 H |
| | Processability | (10) | 0 T/20° C. | 0 T/5° C. | 1 T/20° C. | 1 T/20° C. | 0 T/20° C. |
| | Stain (Black) | (11) | ○ | ○ | ○ | ○ | ○ |
| | resistance (Red) | | ○ | Ⓐ | ○ | ○ | ○ |
| | Alkali resistance | (12) | ○ | ○ | ○ | ○ | ○ |
| | Acid resistance | (13) | ○ | ○ | ○ | ○ | ○ |
| | Solvent resistance | (14) | ○ | ○ | ○ | ○ | ○ |

(Remarks)
○ ... excellent
Ⓐ ... good

TABLE 3

| Materials and items | | Example No. | | Comparative Example 1 | 2 | 3 | 4 | 5 | 6 | 7 | 8 |
|---|---|---|---|---|---|---|---|---|---|---|---|
| Coating formulation | Polyester resin | A | Parts by weight | — | — | — | 80 | 70 | 70 | 70 | 70 |
| | " | B | Parts by weight | — | — | — | — | — | — | — | — |
| | " | C | Parts by weight | — | — | — | — | — | — | — | — |
| | " | D | Parts by weight | 70 | — | — | — | — | — | — | — |
| | " | E | Parts by weight | — | 70 | — | — | — | — | — | — |
| | " | F | Parts by weight | — | — | 70 | — | — | — | — | — |
| | Thinner | (1) | Parts by weight | 200 | 200 | 200 | 200 | 200 | 200 | 200 | 200 |
| | Titanium dioxide | (2) | Parts by weight | 100 | 100 | 100 | 100 | 100 | 100 | 100 | 100 |
| | Melamine resin A | (3) | Parts by weight | 30 | 30 | 30 | 20 | | 30 | 30 | 30 |
| | Melamine resin B | (4) | Parts by weight | | | | | 30 | | | |
| | Acid catalyst A | (5) | Parts by weight | 1.5 | 1.5 | 1.5 | 1.5 | 1.5 | 0.5 | 2.5 | — |
| | Acid catalyst B | (6) | Parts by weight | | | | | | | | 1.5 |
| | Leveling agent | (7) | Parts by weight | 0.5 | 0.5 | 0.5 | 0.5 | 0.5 | 0.5 | 0.5 | 0.5 |
| Coating tests | Luster | (8) | | 92 | 87 | 91 | 91 | 84 | 90 | 86 | 82 |
| | Hardness | (9) | | H | 2 H | HB | F | H-2 H | F | H-2 H | E-2 H |
| | Processability | (10) | | 2 T/20° C. | 6 T/20° C. | 0 T/5° C. | 0 T/20° C. | 2 T/20° C. | 0 T/20° C. | 4 T/20° C. | 2 T/20° C. |
| | Stain (Black) resistance | (11) | | ○ | ○ | Ⓐ | Δ | Δ | Δ | ○ | Δ |
| | (Red) | | | Δ | ○ | Δ | Δ | x | x | ○ | Δ |
| | Alkali resistance | (12) | | ○ | ○ | Δ | Ⓐ | ○ | ○ | ○ | ○ |
| | Acid resistance | (13) | | Ⓐ | ○ | x | ○ | ○ | Δ | ○ | ○ |
| | Solvent resistance | (14) | | ○ | ○ | ○ | Δ | ○ | x | ○ | ○ |

(Remarks)
○ ... excellent
Ⓐ ... good
Δ ... fair
x ... poor

Remarks

1) Solvesso 15/cyclohexanone=1/1 (weight ratio)
2) Tipaque CR 95 (manufactured by Ishihara Sangyo)
3) Cymel 303: hexamethoxymethylolmelamine resin (manufactured by Mitsui Cyanamid)
4) Cymel 325: (manufactured by Mitsui Cyanamid)
5) A: Isopropanolamine-blocked derivative of dodecylbenzenesulfonic acid, represented in parts by weight of the active component in Table.
6) B: Isopropanolamine-blocked derivative of p-toluenesulfonic acid derivative, represented in parts by weight of the active component in Table.
7) BYK 354 (manufactured by Byk Chemie)
8) Measured at incident angle of 60°; according to JIS K5400.
9) Measured by Mitsubishi Uni; tested according to the method of JIS K5400p; flaws on the coating surface evaluated, and critical hardness shown where no flaw formed.
10) Coated steel plate was bent at 180°, and cracks generated at flexed portion observed by a 20-magnification loupe. 2T refers to the case in which two sheets of the same plate are inserted at the bent portion, and 0T the case in which the bending is carried out without insertion of the plates.
11) Stain resistance: after coating with marking ink, left to stand at 20° C. for 24 hours, then wiped off with ethyl alcohol, and the extent of contamination (or stain) shown by relative evaluation.
12) Appearance after dipping in 5% aqueous NaOH solution for 24 hours is shown by relative evaluation.

13) Appearance after dipping in 5% aqueous HCl solution for 24 hours is shown by relative evaluation 14) Appearance after rubbing of the coated surface with gauze impregnated with xylene is shown by relative evaluation.

As shown in Table 2, Examples of the present invention show an excellent hardness, processability, stain resistance, luster, chemical resistance, and solvent resistance.

In contrast, as shown in Table 3, Comparative Example 1, in which the copolymerized polyester resin has a lower molecular weight, has a lower processability and stain resistance (red).

Comparative Example 2, in which the copolymerized polyester resin has a higher glass transition temperature, has a markedly lowered processability.

Comparative Example 3, in which the glass transition temperature is lower, and thus the hardness, stain resistance, and chemical resistance are lowered.

Comparative Example 4, in which the polyester resin/methylated melamine is 80/20, and thus the hardness, stain resistance, and solvent resistance are lowered.

Comparative Example 5, which uses a melamine resin containing less than 60% of hexamethoxymethylolmelamine monomer, and thus the processability and stain resistance are lowered.

Comparative Example 6, in which the acid catalyst amount is reduced, and thus the hardness, stain resistance, acid resistance, and solvent resistance are poor.

Comparative Example 7, in which the acid catalyst amount is higher, and thus the processability is lowered.

Comparative Example 8, in which an amine block derivative of p-toluenesulfonic acid is used as the acid catalyst, and thus the processability and stain resistance are poor.

As described above, the coating composition for a coated metal plate obtained according to the present invention provides an excellent coating.

We claim:

1. A coating composition for coating a metal plate comprising (i) 100 parts by weight of a polyester-melamine resin comprising (a) a polyester resin having a glass transition temperature of 5° to 40 °C. and a number average molecular weight of 15,000 to 30,000 and (b) a melamine resin at a weight ratio (a)/(b) of 75/25 to 55/45 and (ii) 1 to 2 parts by weight of an amine-blocked derivative of a long-chain alkylbenzenesulfonic acid.

2. A coating composition as claimed in claim 1, wherein said melamine resin has a hexamethoxymethylmelamine monomer content of at least 60% by weight.

3. A coating composition as claimed in claim 1, wherein the weight ratio (a)/(b) is 70/30 to 60/40.

4. A coating composition as claimed in claim 1, wherein said long-chain alkylbenzenesulfonic acid is dodecylbenzenesulfonic acid.

5. A coating composition as claimed in claim 1, wherein said amine-blocked derivative of a long-chain alkylbenzenesulfonic acid is the isopropanolamine-blocked derivative of dodecylbenzenesulfonic acid.

* * * * *